United States Patent
Masuda et al.

(10) Patent No.: US 8,896,649 B2
(45) Date of Patent: Nov. 25, 2014

(54) OPTICAL SCANNING DEVICE AND IMAGE FORMING APPARATUS

(75) Inventors: Kensuke Masuda, Kanagawa (JP); Yukio Itami, Kanagawa (JP); Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 192 days.

(21) Appl. No.: 13/346,345

(22) Filed: Jan. 9, 2012

(65) Prior Publication Data

US 2012/0182367 A1  Jul. 19, 2012

(30) Foreign Application Priority Data

Jan. 17, 2011  (JP) ................................. 2011-006888

(51) Int. Cl.
- B41J 27/00 (2006.01)
- B41J 2/435 (2006.01)
- B41J 2/47 (2006.01)
- G02B 26/12 (2006.01)

(52) U.S. Cl.
CPC ............... B41J 2/473 (2013.01); G02B 26/123 (2013.01); G02B 26/124 (2013.01)
USPC ........... 347/261; 347/258; 347/259; 347/260; 347/262; 347/263

(58) Field of Classification Search
USPC ......................................... 347/258–263, 118
See application file for complete search history.

(56) References Cited

U.S. PATENT DOCUMENTS

| | | | |
|---|---|---|---|
| 5,900,903 A * | 5/1999 | Fukita | 347/260 |
| 7,450,146 B2 * | 11/2008 | Sakaue et al. | 347/263 |
| 7,564,607 B2 | 7/2009 | Imai | |
| 7,602,540 B2 | 10/2009 | Masuda et al. | |
| 7,619,796 B2 | 11/2009 | Imai | |
| 7,671,884 B2 | 3/2010 | Itami et al. | |
| 7,679,801 B2 | 3/2010 | Itami | |
| 7,751,107 B2 | 7/2010 | Imai | |
| 7,755,822 B2 | 7/2010 | Imai | |
| 7,859,732 B2 | 12/2010 | Imai | |
| 7,898,709 B2 | 3/2011 | Masuda et al. | |
| 7,903,135 B2 * | 3/2011 | Ichii et al. | 347/238 |
| 8,014,041 B2 | 9/2011 | Suzuki et al. | |
| 8,014,051 B2 | 9/2011 | Imai | |

(Continued)

FOREIGN PATENT DOCUMENTS

| | | |
|---|---|---|
| JP | 63-124016 | 5/1988 |
| JP | 10-90620 | 4/1998 |

(Continued)

OTHER PUBLICATIONS

Office Action issued Apr. 30, 2014 corresponding to Japanese Application No. 2011-006888.

*Primary Examiner* — Sarah Al Hashimi (74) *Attorney, Agent, or Firm* — Oblon, Spivak, McClelland, Maier & Neustadt, L.L.P.

(57) ABSTRACT

An optical scanning device includes: a light source unit; a light deflecting unit that deflects a light beam emitted from the light source unit; a scanning optical device that focuses the light beam deflected by the light deflecting unit on a scanned surface; and a light shielding member. The scanning optical device is provided in a direction in which a sound pressure level of a noise caused by rotation of a rotating polygon mirror included in the light deflecting unit is highest.

15 Claims, 10 Drawing Sheets

(56) References Cited

U.S. PATENT DOCUMENTS

| | | | |
|---|---|---|---|
| 8,023,166 B2 | 9/2011 | Nakamura et al. | |
| 8,059,149 B2 | 11/2011 | Saisho et al. | |
| 8,072,478 B2 | 12/2011 | Tanabe et al. | |
| 8,081,203 B2 | 12/2011 | Masuda et al. | |
| 2003/0063359 A1* | 4/2003 | Ishihara | 359/207 |
| 2007/0236557 A1* | 10/2007 | Imai et al. | 347/259 |
| 2008/0019255 A1 | 1/2008 | Imai et al. | |
| 2008/0068692 A1* | 3/2008 | Yoshimura | 359/204 |
| 2009/0225148 A1 | 9/2009 | Itami et al. | |
| 2010/0091083 A1 | 4/2010 | Itami et al. | |
| 2010/0310284 A1 | 12/2010 | Funato et al. | |
| 2011/0050836 A1 | 3/2011 | Masuda | |
| 2011/0102536 A1 | 5/2011 | Imai | |
| 2012/0056968 A1 | 3/2012 | Imai et al. | |

FOREIGN PATENT DOCUMENTS

| | | |
|---|---|---|
| JP | 2005-84565 | 3/2005 |
| JP | 2006-71668 | 3/2006 |
| JP | 2006-293267 | 10/2006 |
| JP | 3862950 | 10/2006 |
| JP | 2006293267 A * | 10/2006 |
| JP | 2007-72090 | 3/2007 |
| JP | 2008-76566 | 4/2008 |
| JP | 4154152 | 7/2008 |
| JP | 2008-185959 | 8/2008 |
| JP | 2008-233919 | 10/2008 |
| JP | 2009-271353 | 11/2009 |
| JP | 4413110 | 11/2009 |
| JP | 4445234 | 1/2010 |
| JP | 2010-72638 | 4/2010 |
| JP | 2010-175996 | 8/2010 |
| JP | 4689434 | 2/2011 |

* cited by examiner

| | DISTANCE BETWEEN LIGHT BLOCKING MEMBER 211 AND SURFACE OF POLYGON MIRROR 103 | DISTANCE BETWEEN LIGHT BLOCKING MEMBER 212 AND SURFACE OF POLYGON MIRROR 103 | DISTANCE BETWEEN LIGHT BLOCKING MEMBER 213 AND SURFACE OF POLYGON MIRROR 103 | DISTANCE BETWEEN LIGHT BLOCKING MEMBER 214 AND SURFACE OF POLYGON MIRROR 103 | DEVIATION OF LIGHT BLOCKING MEMBERS 214 AND 213 | PRESENCE OR ABSENCE OF NOTCH IN LIGHT BLOCKING MEMBER | SOUND PRESSURE LEVEL AT POSITION SEPARATED BY 50 cm FROM POLYGON MIRROR |
|---|---|---|---|---|---|---|---|
| CONDITION 1 | 1.1 mm (R1=11.0 mm) | 1.1 mm (R2=11.0 mm) | 1.1 mm (R3=11.0 mm) | 1.1 mm (R4=11.0 mm) | PARALLEL TO Y AXIS | ABSENCE | 80.7 dB |
| CONDITION 2 | 1.1 mm (R1=11.0 mm) | 5.0 mm (R4=14.9 mm) | 1.1 mm (R3=11.0 mm) | 5.0 mm (R4=14.9 mm) | PARALLEL TO Y AXIS | ABSENCE | 75.7 dB |
| CONDITION 3 | 1.1 mm (R1=11.0 mm) | 1.1 mm (R2=11.0 mm) | 1.1 mm (R3=11.0 mm) | 1.1 mm (R4=11.0 mm) | DEVIATED FROM Y-AXIS DIRECTION TOWARD ROTATION DIRECTION OF POLYGON MIRROR | ABSENCE | 78.5 dB |
| CONDITION 4 | 1.1 mm (R1=11.0 mm) | 1.1 mm (R2=11.0 mm) | 1.1 mm (R3=11.0 mm) | 1.1 mm (R4=11.0 mm) | PARALLEL TO Y AXIS | PRESENCE | 77.2 dB |

| NUMBER OF SURFACES OF POLYGON MIRROR | 4 SURFACES | 5 SURFACES | 6 SURFACES |
|---|---|---|---|
| RADIUS OF INSCRIBED CIRCLE OF POLYGON MIRROR | 7 mm | 10 mm | 18 mm |
| DISTANCE BETWEEN POLYGON MIRROR AND LIGHT BLOCKING MEMBER | 1.1 mm | 1.8 mm | 2.6 mm |

OPTICAL SCANNING DEVICE AND IMAGE FORMING APPARATUS

CROSS-REFERENCE TO RELATED APPLICATION

The present application claims priority to and incorporates by reference the entire contents of Japanese Patent Application No. 2011-006888 filed in Japan on Jan. 17, 2011.

BACKGROUND OF THE INVENTION

1. Field of the Invention

The present invention relates to an optical scanning device and an image forming apparatus. The present invention relates particularly to the optical scanning device equipped with a light deflector that has a rotating deflection reflective surface and to the image forming apparatus, equipped with the optical scanning device, such as a copying machine, a facsimile, a printer, or a multifunction peripheral that includes the above functions.

2. Description of the Related Art

In an image forming apparatus in which an electrophotographic process is performed, an optical scanning device has been used for image formation. In the optical scanning device, a light beam that is emitted from a light source and deflected by a light deflector is focused, for scanning, on a surface of a photosensitive element serving as an illuminated surface so as to form a latent image. For example, a laser is used as the light source, and a polygon mirror that is rotated by a motor or the like is used as the light deflector. A reflective surface provided to a side surface of a polygonal of the light deflector is illuminated with the laser light, and a scanning operation is performed with the reflected light.

Among the light beams deflected by the light deflector, a light beam that is reflected from the lens surface of the scanning optical system is a so-called unnecessary light (ghost light). If the unnecessary light is incident on the scanning optical system, a quality of an output image may deteriorate.

On the other hand, Japanese Patent No. 4154152 discloses an optical scanning device that deflects a plurality of light beams emitted from a plurality of the light sources with different deflecting surfaces of the same deflector having a plurality of deflecting surfaces. The optical scanning device focuses the plurality of light beams deflected by the different deflecting surfaces on the corresponding scanned surfaces through respective scanning lens systems that are provided for respective light beams deflected by different deflecting surfaces. The optical scanning device includes a rotating body that rotates the deflector and a claw member that prevents the rotating body from being detached. In the optical scanning device, the claw member functions as a light shielding member that shields a flare light reflected from a surface of a lens in a scanning lens system among a plurality of the scanning lens systems so that the flare light could not be incident on the other scanning lens systems among the plurality of the scanning lens systems. The claw member is provided in a non-effective area, within a main-scanning cross section, interposed between an optical path of the light beam that is incident on the deflecting surface of the deflector and an optical path of a scanning light beam that has been deflected by the deflecting surface of the deflector and is then incident on the scanned surface.

Recently, as high-density images and high-speed printing are required, a rotation speed of a rotating polygon mirror has been increased. However, if the rotating polygon mirror rotates at a high speed, a problem arises in that a wind noise increases.

For example, in the optical scanning device disclosed in Japanese Patent No. 4154152, in a case where the claw member that functions as the light shielding member is provided near the light deflector, the rotary flow of air around the light deflector is obstructed by the light shielding member, so that the noise increases.

Therefore, there has been a requirement of an optical scanning device that is capable of shielding the ghost light output from the scanning optical system with the light shielding member so as to improve a quality of formed images and reducing a directional noise associated with the rotation of the light deflector.

Therefore, there is a need for providing a light-scanning apparatus that is capable of shielding the ghost light output from the scanning optical system with the light shielding member and reducing a level of a noise caused by the light shielding member associated with the rotation of a rotating member of the light deflector.

SUMMARY OF THE INVENTION

It is an object of the present invention to at least partially solve the problems in the conventional technology.

An optical scanning device includes: a light source unit; a light deflecting unit that deflects a light beam emitted from the light source unit; a scanning optical device that focuses the light beam deflected by the light deflecting unit on a scanned surface; and a light shielding member. The scanning optical device is provided in a direction in which a sound pressure level of a noise caused by rotation of a rotating polygon mirror included in the light deflecting unit is highest.

An image forming apparatus includes: the optical scanning device that includes a light source unit, a light deflecting unit that deflects a light beam emitted from the light source unit, a scanning optical device that focuses the light beam deflected by the light deflecting unit on a scanned surface, and a light shielding member in such a way that the scanning optical device is provided in a direction in which a sound pressure level of a noise caused by rotation of a rotating polygon mirror included in the light deflecting unit is highest; a plurality of image carriers provided on the scanned surface; a developing unit that develops a latent image, formed on each of the image carriers using a scanning light of the optical scanning device, into a toner image; a transfer unit that transfers the toner image that has been developed onto a transfer material; and a fixing unit that fixes the toner image that has been transferred onto the transfer material.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an optical scanning device and an image forming apparatus according to the invention will be described with reference to the drawings. In addition, the invention is not limited to embodiments described below, but other embodiments, additions, modifications, eliminations, or the like may be made and contrived within the scope by the ordinarily skilled persons. Any embodiments by which the effects of the invention can be obtained are included within the scope thereof.

Figure 1:
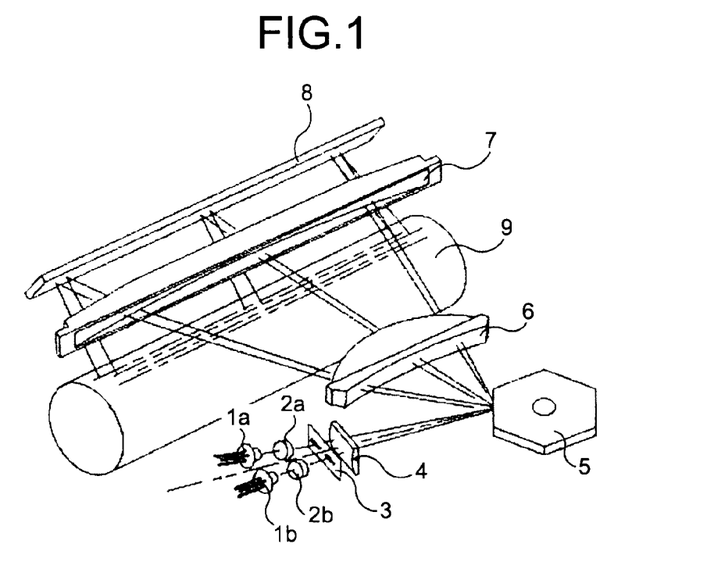
FIG. 1 is a perspective view illustrating an example of a schematic configuration of components ranging from a light source to a photosensitive element in an optical scanning device according to an embodiment.

FIG. 1 is a perspective view illustrating an example of a schematic configuration of components on a path from a light source of an optical system to a scanned surface in an optical scanning device according to an embodiment.

Referring to FIG. 1, the optical scanning device includes light sources (LD) 1a and 1b; coupling lenses 2a and 2b; an aperture 3; a cylindrical lens 4; a light deflecting unit 5; a first scanning lens 6; a second scanning lens 7; a reflecting mirror 8; and a photosensitive element 9. Two light beams are emitted from the two light sources 1a and 1b. The two light beams emitted from the two light sources 1a and 1b are coupled with a subsequent optical system by the coupling lenses 2a and 2b and the beam is shaped by the aperture 3. Thereafter, the beam is focused only in a sub-scanning direction by the cylindrical lens 4, and a line image is formed in the vicinity of a reflection point of the light deflecting unit 5.

The light deflecting unit 5 is configured to include a rotating polygon mirror with a plurality of deflection reflective surface formed at predetermined intervals on a circumferential surface of the rotating polygon mirror. The rotating polygon mirror is driven to rotate at a constant high speed by a motor serving as a driving source so as to reflect an incident light beam that is also deflected at a constant angular velocity.

The light beam deflected by the light deflecting unit 5 passes through the first scanning lens 6 and the second scanning lens 7 and is reflected by the reflecting mirror 8 to be guided to the photosensitive element 9. The first scanning lens 6 and the second scanning lens 7 form a scanning optical system.

Due to the focusing function and the fθ function of the scanning optical system, each light beam is focused on a surface of the photosensitive element 9 serving as the scanned surface, and the surface of the photosensitive element 9 is scanned with the light beam at a constant velocity in the direction parallel to an axis of rotation of the photosensitive element 9.

The light beams emitted from the two light sources 1a and 1b are modulated based on an image signal to obtain a modulated signal, according to which an image is written onto the surface of the photosensitive element 9.

The image forming apparatus according to the embodiment includes the optical scanning device of the embodiment; a plurality of image carriers provided on the scanned surface; a developing unit for developing a latent image, that is formed on the image carriers with the scanned light by the optical scanning device, into a toner image; a transfer unit that transfers the developed toner image onto a transferred material; and a fixing unit that fixes the transferred toner image onto the transferred material.

Figure 2:
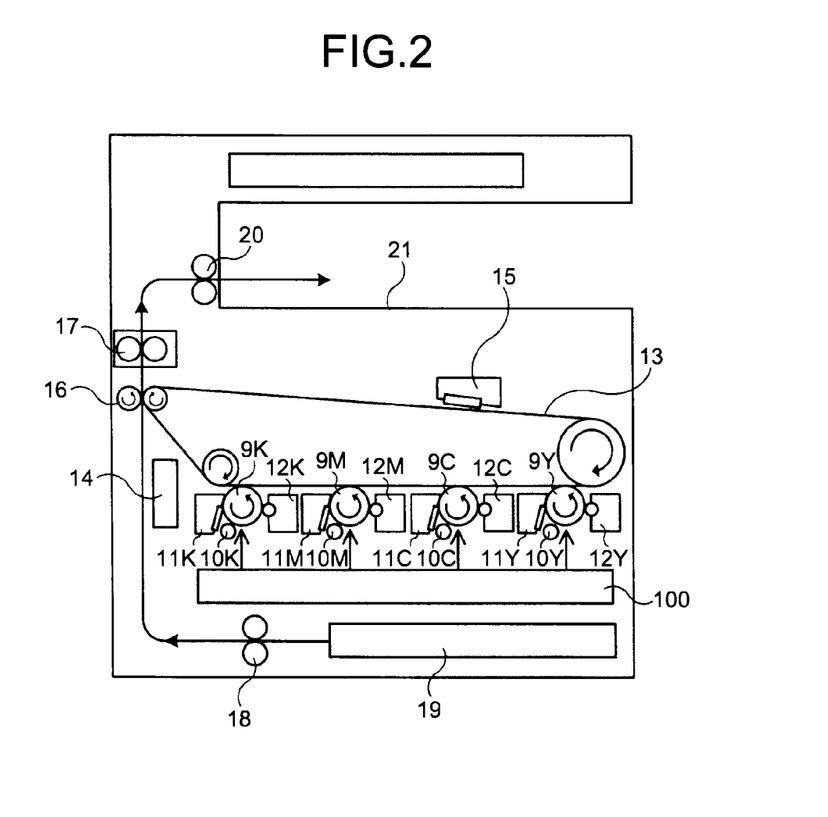
FIG. 2 is a cross-sectional view illustrating an example of an image forming apparatus according to the embodiment.

FIG. 2 is a cross-sectional view illustrating an example of the image forming apparatus according to the embodiment.

As illustrated in FIG. 2, each photosensitive element 9 (for the colors of Yellow, Magenta, Cyan, and blacK, that are hereafter abbreviated as YMCK) is an image carrier having a drum shape provided for each of the YMCK colors. The photosensitive elements 9 have a same diameter and are in pressure contact with an intermediate transfer belt 13 at an equal interval. In addition, a charging unit 10, a developing unit 11, the intermediate transfer belt 13, a drum cleaning unit 12, and a neutralizing unit (not illustrated) are provided in the vicinity of the photosensitive element 9 along the rotation direction in each of the photosensitive elements 9.

The photosensitive element 9 between the charging unit 10 and the developing unit 11 is illuminated with a laser light beam used for writing from an optical scanning device 100.

The charging unit 10 (YMCK) is a roller-shaped unit that is provided in a non-contact manner for the photosensitive element 9 of the respective color to charge the surface of the photosensitive element 9. When the surface of the photosensitive element 9 charged by the charging unit 10 is illuminated with the laser light beam used for writing from the optical scanning device 100, an electrostatic latent image of the corresponding color is formed on the photosensitive element 9.

The developing unit 11 (YMCK) is provided by allowing the developing roller to be in contact with the photosensitive element 9, and retains toner (developer) of the respective color corresponding to the photosensitive element 9 for the respective color. When an image is formed, the toner is supplied to the photosensitive element 9 so as to develop the electrostatic latent image formed on the photosensitive element 9. The electrostatic latent image is developed with the toner and becomes the toner image. The drum cleaning unit 12 (YMCK) is provided by allowing a blade (cleaning blade) to be in contact with the photosensitive element 9. The drum cleaning unit 12 cleans the surface of the photosensitive element 9 by removing and collecting residual toner, a slip of paper, or the like remaining on the photosensitive element 9 after the toner image is transferred onto the intermediate transfer belt 13. In addition, a neutralizing unit (not illustrated) is provided between the drum cleaning unit 12 and the charging unit 10. The neutralizing unit neutralizes the surface of the photosensitive element 9.

The intermediate transfer belt 13 is an endless belt for sequentially superposing the toner images of the colors formed on the surfaces of the photosensitive elements 9 onto each other so as to perform a transfer process. A full-colored image is formed on the intermediate transfer belt 13 when the toner images of the respective colors are sequentially superposed onto each other.

An optical sensor 14 is a device that is provided in a non-contact manner to the intermediate transfer belt 13. The optical sensor 14 detects a toner pattern formed as a test pattern to be used in maintenance of the image forming apparatus.

A transfer belt cleaning unit 15 is a unit that is provided to allow a blade (cleaning blade) to be in contact with the intermediate transfer belt 13. The transfer belt cleaning unit 15 cleans a surface of the intermediate transfer belt 13 by removing and collecting residual toner or a toner pattern remaining on the intermediate transfer belt 13 after the toner image is transferred onto a recording sheet that is fed.

A transfer roller 16 transfers a color image formed on the intermediate transfer belt 13 onto the recording sheet that is conveyed from a paper feed tray 19. A fixing unit 17 fixes the color image that is transferred onto the recording sheet on the recording sheet by heating.

A paper feeding roller 18 feeds the recording sheet. The paper feed tray 19 stores the recording sheets separately according to the sizes of the recording sheets. A discharging roller 20 discharges the recording sheet on which the color image is thermally fixed to outside of the image forming apparatus. A discharge tray 21 is a tray for stacking the recording sheets that are discharged.

In addition, all the photosensitive elements 9 rotate in the same direction. In addition, the intermediate transfer belt 13 is moved in the direction opposite to the rotation direction of the photosensitive elements 9, and the transfer roller 16 rotates in the direction opposite to the rotation direction of the intermediate transfer belt 13 (in the same rotation direction as the photosensitive element 9). In FIG. 2, the photosensitive elements 9 and the transfer roller 16 rotate counterclockwise, and the intermediate transfer belt 13 rotates clockwise.

Figure 3A:
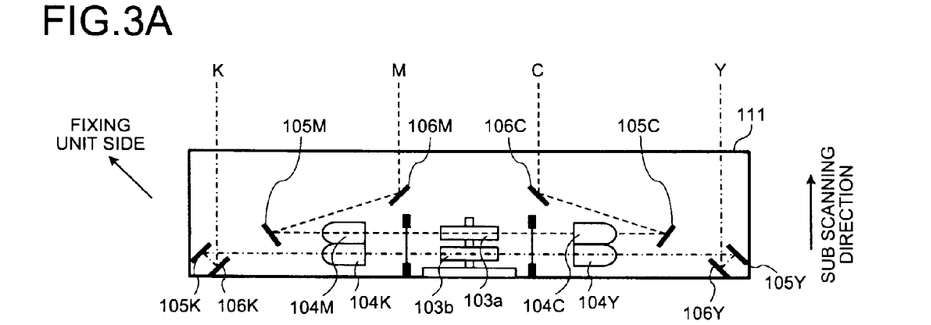
FIG. 3A is a cross-sectional view and FIG. 3B is a top view illustrating the optical scanning device according to the embodiment.
Figure 3B:
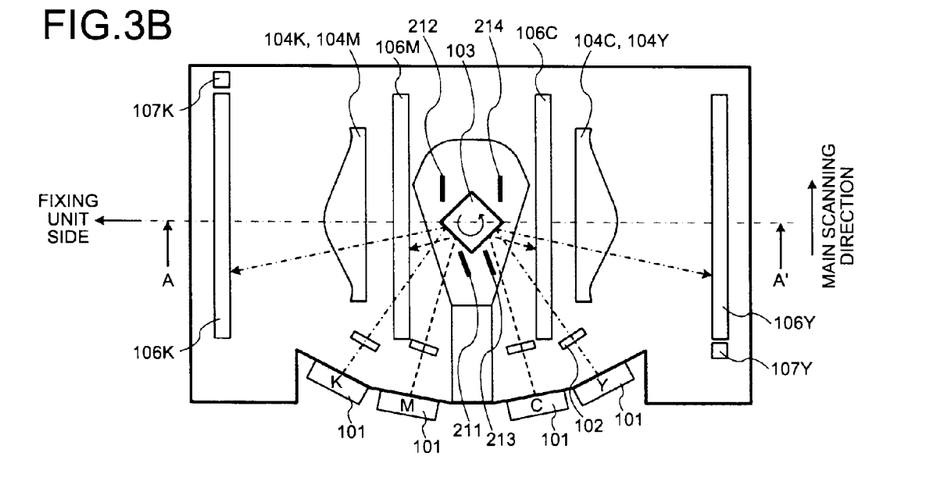

FIG. 3A is a cross-sectional view and FIG. 3B is a top view illustrating the optical scanning device according to an embodiment.

As illustrated in FIGS. 3A and 3B, in the optical scanning device 100, light source units 101 (YMCK) are provided in the order of K, M, C, and Y in the counterclockwise direction as seen in the top view of FIG. 3B. Each of the light source units 101 includes a semiconductor laser serving as a light source device, a coupling lens, and an aperture. As described in FIG. 1, the light beam shaped by the aperture 3 is focused by the cylindrical lens 4 only in the sub-scanning direction (102 in FIG. 3B), so that a line image is formed in the vicinity of the reflection point of a rotating polygon mirror (polygon mirror) 103 that forms the light deflecting unit.

In the embodiment illustrated in FIGS. 3A and 3B, as illustrated in the cross sectional view of FIG. 3A, the heights of the light sources are different between the light source units 101 [101Y and 101K] and the light source units 101 [1010 and 101M], so that the light beams from the light source units 101C and 101M are incident on a surface 103$a$ of the polygon mirror 103, and the light beams from the light source units 101Y and 101K are incident on a surface 103$b$ of the polygon mirror.

As seen in the top view of FIG. 3B, the polygon mirror 103 rotates at a constant velocity counterclockwise and deflects the incident light beam from the light source units 101. A total of the four light beams deflected by the polygon mirror 103 pass through scanning lenses 104 (YMCK) and are reflected by reflecting mirrors 105 (YMCK) (not illustrated in the top view) and reflecting mirrors 106 (YMCK) to be guided to the photosensitive elements. In addition, scanning start points of the scanning lenses 104 are controlled by synchronization sensing devices 107 (YK) provided at scanning leading positions.

In addition, in the embodiment, the scanning lens 104 (YMCK) provides focusing functions of the two lenses, that is, the first scanning lens 6 and the second scanning lens 7 illustrated in FIG. 1 by using a single body.

The scanning lenses 104 are arranged such that the scanning lenses 104K and 104Y and the scanning lenses 104C and 104M are provided to be left-right symmetric with respect to the polygon mirror 103 as a center of the symmetry. In such a left-right symmetric scanning optical system, light reflected by the lens surface of the scanning lens 104 (for example, 104K) is incident on the scanning lens 104 (for example, 104Y) provided on a side opposite to the scanning lens 104K as a ghost light and may cause a problem in that the image quality deteriorates due to the ghost light. In order to prevent the ghost light from being incident on the scanning optical system provided on the opposite side, it is necessary to provide a light shielding member therein.

Figure 15A:
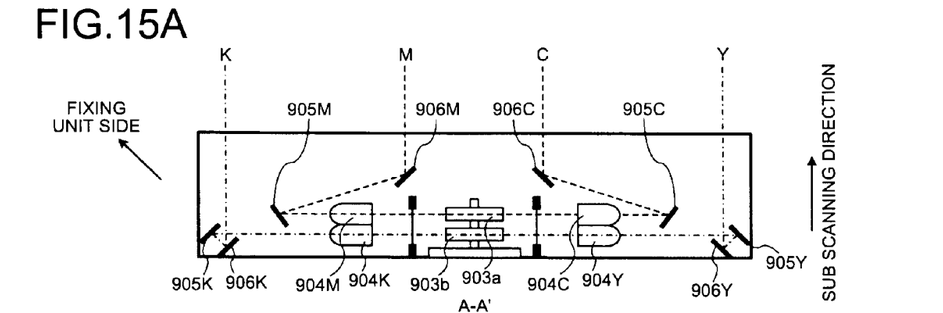
FIG. 15A is a cross-sectional view and FIG. 15B is a top view illustrating an optical scanning device in the related art.
Figure 15B:
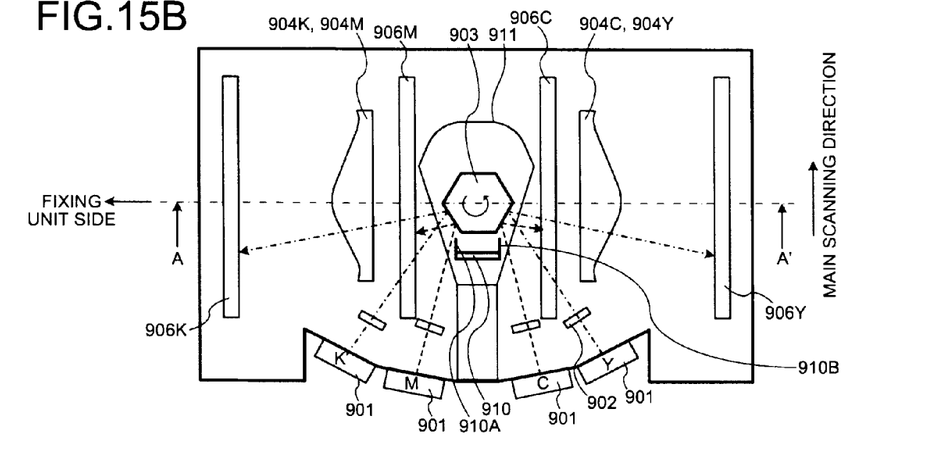

FIG. 15A and FIG. 15B are a cross-sectional view and a top view illustrating an optical scanning device of the related art.

In the optical scanning device of the related art illustrated in FIGS. 15A and 15B, a polygon mirror 903 has six surfaces with a radius of an inscribed circle of 18 mm. A light shielding member 910 is provided on a side of a light source unit 901 as seen from the rotation center of the polygon mirror 903. The light shielding member 910 is constructed with a metal plate having a thickness of 0.5 mm. A light shielding member 910A is provided at scanning lenses 904K and 904M side, and one light shielding wall 910B is provided at scanning lenses 904Y and 904C side. The two light shielding members are provided in a left-right symmetric manner with respect to the symmetric central line B of the scanning lens 104K and the scanning lens 104Y. The light shielding member 910 is provided on a housing 911 of the optical scanning device. The light shielding member 910 is provided in such a manner that a space from the polygon mirror 903 is constant.

Herein, in a case where the recording width of the optical scanning device is to be widened, an angle of field (an angle capable of being used for writing in one scanning) of the light deflecting unit is to be widened, and the polygon mirror having surfaces with the number less than six (for example, five or four) is needed. In the polygon mirror having five or four surfaces, although the radius of an inscribed circle necessary for obtaining the same angle of field can be reduced in comparison to the polygon mirror having six surfaces, if the radius of an inscribed circle is reduced, the ghost light is easily incident on the scanning optical system of the opposite side.

Figure 4:
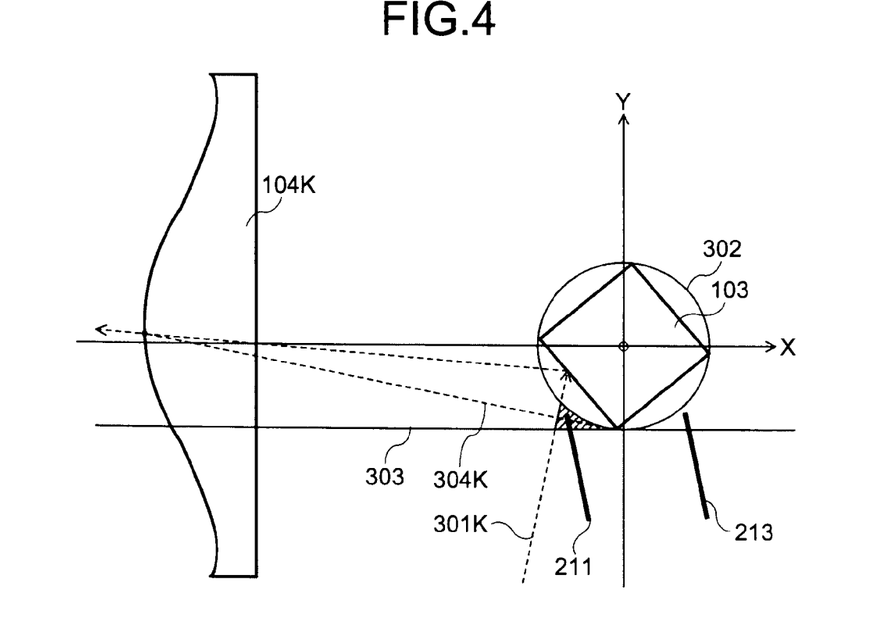
FIG. 4 is a schematic diagram illustrating an example of arrangement of a light shielding member in the optical scanning device according to the embodiment.
Figure 5:
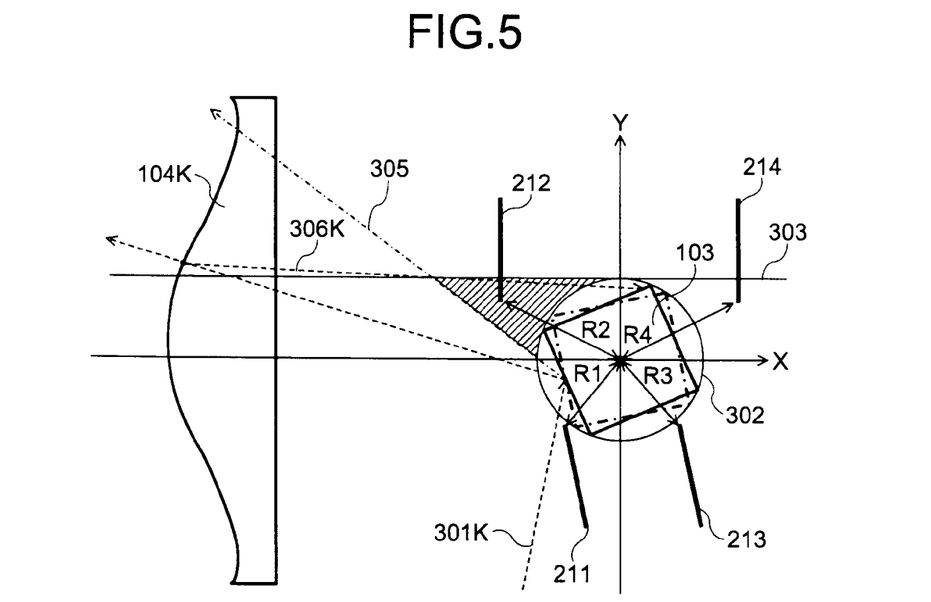
FIG. 5 is a schematic diagram illustrating an example of arrangement of the light shielding member in the optical scanning device according to the embodiment.

FIGS. 4 and 5 illustrate a calculation process of the reflected light (ghost light) from the second surface of the scanning lens 104K using the polygon mirror 103 that has four surfaces and a radius of an inscribed circle of 7 mm.

Here, the direction that passes through the rotation center of the polygon mirror that is included in the light deflecting unit and is parallel to the scanning direction of the light beam that scans the scanned surface is defined as a Y-axis direction, and the direction perpendicular to the rotating shaft of the polygon mirror and the Y-axis direction is defined as an X-axis direction.

FIG. 4 is a diagram illustrating a positional relation between a first light shielding member 211 and the polygon mirror 103 on the incident light side (the side near the light source device in the main-scanning direction).

As illustrated in FIG. 4, the first light shielding member 211 is provided so that at least a portion (edge portion) thereof is present in an area surrounded by a circumscribed circle 302 of the polygon mirror 103, a straight line 303 that is perpendicular to the Y axis and is tangential to the circumscribed circle 302, and an optical axis of an incident light 301K that is the light beam emitted from the light source unit 101K.

According to this configuration, the incident light 301K can be incident on the polygon mirror 103, and a ghost light 304K can be shielded by the first light shielding member 211.

In the configuration illustrated in FIG. 4, a distance between the first light shielding member 211 and the polygon mirror 103 is 1.1 mm, which is very short compared with the distance of 2.4 mm in the case of the polygon mirror having six surfaces. As will be described later, when the polygon mirror having four surfaces is provided, because there is a need to provide a third light shielding member 212 at a position separated away from the incident light 301K in addition to the first light shielding member 211, a noise that occurs according to the rotation of the polygon mirror may cause a problem.

FIG. 5 is a schematic diagram illustrating a positional relation between the third light shielding member 212 on the reflected light side (the side far from the light source device in the main-scanning direction) and the polygon mirror 103.

As illustrated in FIG. 5, the third light shielding member 212 is provided so that at least a portion (edge portion) thereof is present in an area surrounded by the circumscribed circle 302 of the polygon mirror 103, the straight line 303 that is perpendicular to the Y axis and is tangential to the circumscribed circle 302, and an optical axis of the light beam emitted from a plurality of the light source units 101 and deflected by the polygon mirror 103, that is, a borderline of the area where a synchronization light 305 to the synchronization sensing device 107K passes through.

By comparing FIG. 4 with FIG. 5, the area where the third light shielding member 212 can be provided is wider than that of the first light shielding member 211. This is because the rotation center of the polygon mirror 103 is located at the reflected light side, so that a range in which the ghost light can be shielded by a main body of the polygon mirror 103 is wider in the reflected light side than the incident light side. Therefore, in order to reduce the noise caused by the configuration where the light shielding member is provided to be a nearby position to the polygon mirror 103, when a distance between the first light shielding member 211 near the incident light side and the rotation center of the polygon mirror 103 is denoted by R1 and a distance between the third light shielding member 212 far from the incident light side and the rotation center of the polygon mirror 103 is denoted by R2, a relation R1<R2 may be satisfied. In the embodiment described above, R1=1.1 mm and R2=5 mm have been used.

Although the first and third light shielding members 211 and 212 shield the ghost light 304K and ghost light 306K from the scanning lens 104K, the first and third light shielding members 211 and 212 may also shield ghost lights 304Y and 306Y from the scanning lens 104Y.

On the other hand, in order to certainly shield the ghost lights, it is preferable that each of the light shielding members be provided for the respective ghost lights from the scanning lenses 104Y and 104K.

More specifically, it is preferable that a second light shielding member 213 and a fourth light shielding member 214 for the ghost lights 304Y and 306Y from the scanning lens 104Y be added so that a total of four light shielding members are provided in the vicinity of the polygon mirror 103.

In this case, because the light source unit 101K and the light source unit 101Y, and the scanning lens 104K and the scanning lens 104Y are provided in a left-right symmetric manner with respect to the polygon mirror 103 as the center of symmetry, when a distance between the second light shielding member 213 near the incident light side and the rotation center of the polygon mirror 103 is denoted by R3 and a distance between the fourth light shielding member 214 far from the incident light side and the rotation center of the polygon mirror 103 is denoted by R4, relations R1=R3 and R2=R4 may be satisfied.

In addition, in order to certainly shield the ghost lights, it is preferable that the polygon mirror 103 is provided so as to be inserted into an area surrounded by the light shielding members. In other words, it is preferable that a straight line that connects the upper end portions of the first light shielding member 211 and the second light shielding member 213 near the incident light side in the Y-axis direction and the circumscribed circle 302 of the polygon mirror 103 intersect each other at two points and also that another straight line that connects lower end portions of the third light shielding member 212 and the fourth light shielding member 214 near the reflected light side in the Y-axis direction and the circumscribed circle 302 intersect each other at two points.

Figures 6A, 6B:
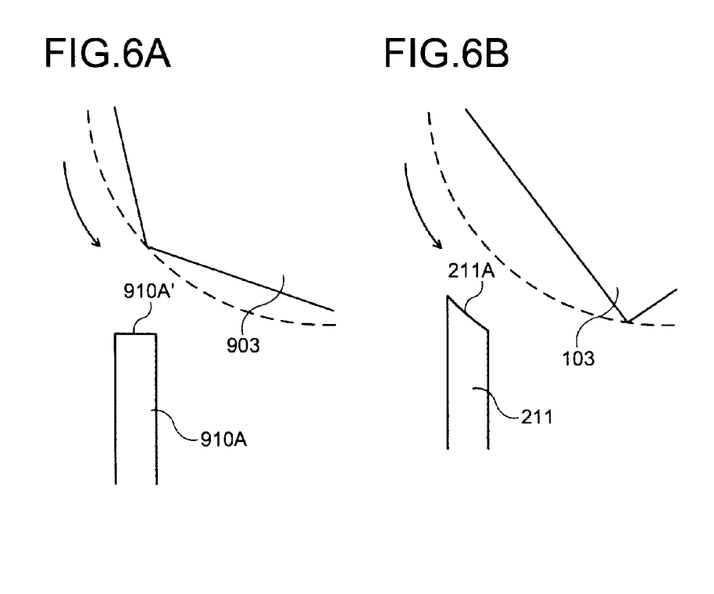
FIGS. 6A and 6B are schematic diagrams illustrating shapes of edge portions of the light shielding member.

FIGS. 6A and 6B are schematic diagrams illustrating a shape of an edge portion of the light shielding member. An edge portion 910A' of the light shielding member 910A of the related art illustrated in FIG. 6A has a shape where a contact area is large with respect to an air flow caused by the rotation of the polygon mirror 103. When the edge portion has such a shape, when the polygon mirror 103 and the light shielding member are provided so that the distance therebetween is short, turbulence occurs in the vicinity of the edge portion 910A', causing a problem in that a noise is increased.

On the contrary, an edge portion 211A of the light shielding member of the embodiment illustrated in FIG. 6B has a curved surface parallel to the circumscribed circle 302 of the polygon mirror 103, so that the contact area of the light shielding member with respect to the air flow of the rotation may be reduced. In addition, in this manner, with respect to all the light shielding members 211 to 214, the edge portion on the light deflecting unit side may have a curve surface parallel to the circumscribed circle. When the polygon mirror 103 and the light shielding member are near to each other, it is preferable that the distance between the edge portion of the light shielding member and the polygon mirror 103 be constant irrespective of the arranged positions.

The light deflecting unit includes a plurality of the polygon mirrors 103 that are stacked in the rotating shaft direction at a predetermined interval, and the light shielding member is provided so that a plurality of the ghost lights that are different in the rotating shaft direction (height direction) of the polygon mirror 103 are shielded by one light shielding member.

As described more specifically with reference to FIGS. 3A and 3B, heights of the first and third light shielding members 211 and 212 are set so that the reflected lights from the scanning lens 104K and the scanning lens 104M that are stacked as two-tiered are shielded by one light shielding member. Similarly, heights of the second and fourth light shielding members 213 and 214 are set so that the reflected lights from the scanning lens 104Y and the scanning lens 104C are shielded by each one of the second and fourth light shielding members 213 and 214. In the meantime, as illustrated in FIGS. 3A and 3B, although the scanning lenses 104K and 104M and the scanning lenses 104Y and 104C are provided respectively at the same positions as seen from the top view, the light source units 101K and 101M and the light source units 101Y and 101C are provided in different positions. In this case, although the areas where the first to fourth light shielding members 211, 212, 213, and 214 are provided are different with respect to K and M and with respect to Y and C, the light shielding members are provided so that the areas overlap each other, and thus, the reflected lights originated from the scanning lenses 104, that are stacked in a multiple-tiered manner, may be shielded by using one light shielding member.

In addition, it is preferable that the first to fourth light shielding members 211 to 214 have a slit corresponding to the interval of the reflective surfaces of the stacked polygon mirrors 103 in the rotating shaft direction of the polygon mirrors 103.

Figure 9:
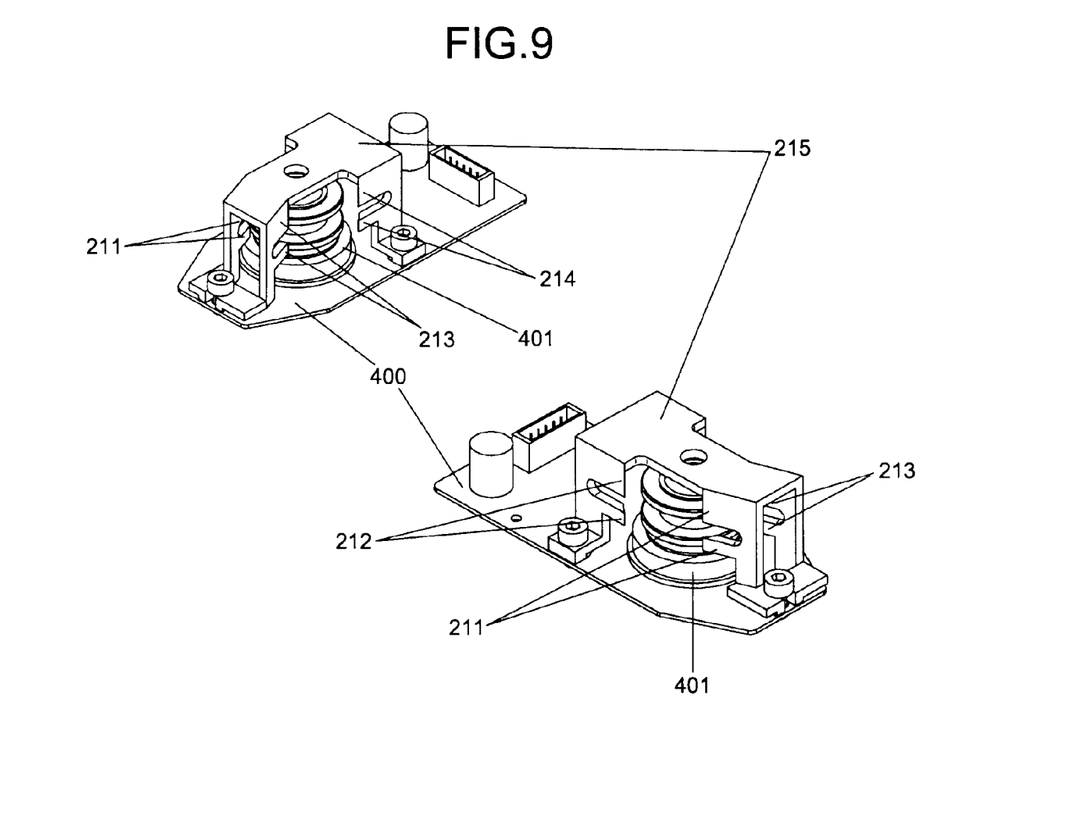
FIG. 9 is a perspective view of the light shielding member.

That is, by forming a slit at a portion that is unnecessary for light shielding in each of the first to fourth light shielding members 211 to 214 as illustrated in FIG. 9, a portion where an air flow caused by the rotation of the polygon mirror 103 interferes with the light shielding members can be reduced and the generation of a noise may be reduced. The sound pressure level of the noise can be reduced by forming the slit in the light shielding members, as illustrated in the table of FIG. 7.

Figure 7:
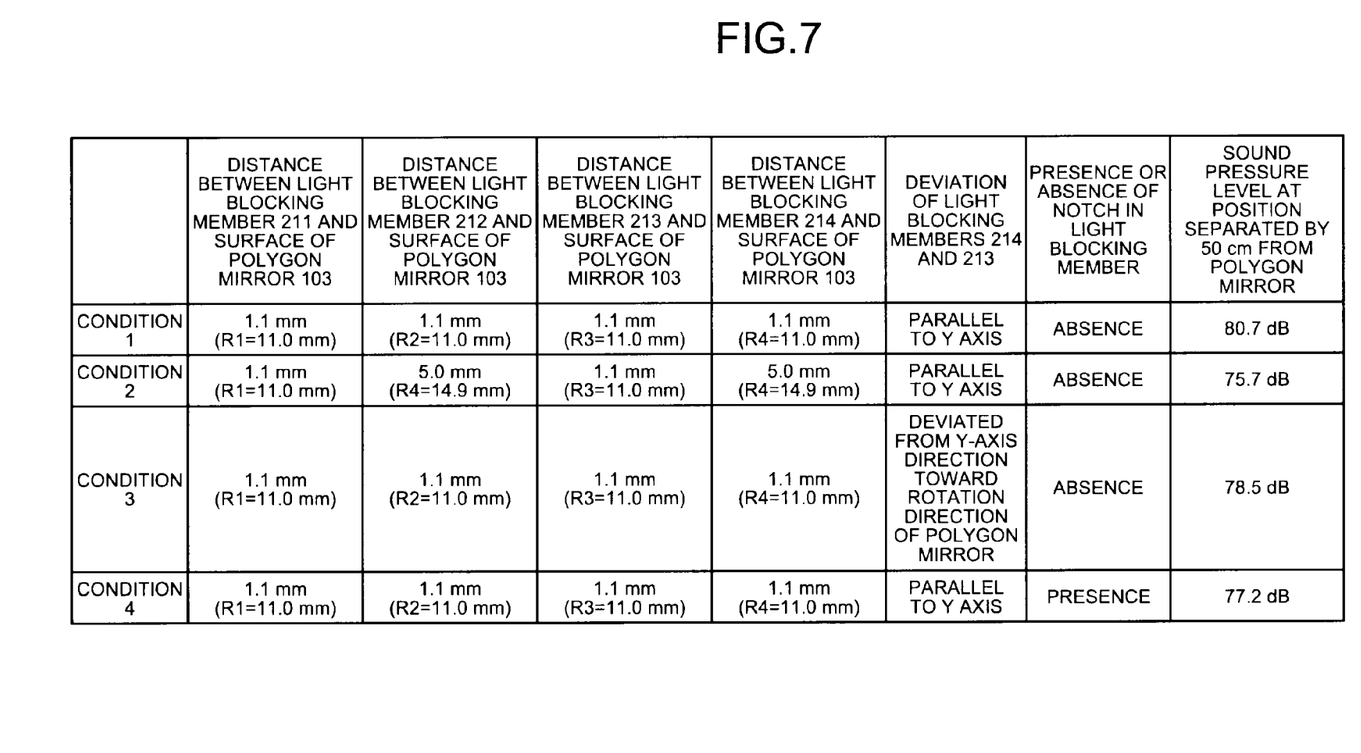
FIG. 7 is a table showing evaluation results of sound pressure levels due to noise measured at a position separated away from a light deflecting unit by 50 cm.

FIG. 7 is a table showing measurement results of sound pressure levels of the noise measured at a position separated away from the polygon mirror 103 by 50 cm under the following Conditions 1 to 4.

Condition 1: the case where the first to fourth light shielding members 211 to 214 are all provided at positions separated away from the surface of the polygon mirror by 1.1 mm.

Condition 2: the case where only the third and fourth light shielding members 212 and 214 provided on the side opposite to the light source are arranged at positions separated away from the surface of the polygon mirror by 5 mm.

Condition 3: the case where the first to fourth light shielding members 211 to 214 are all provided at positions separated away from the surface of the polygon mirror by 1.1 mm in such a way that the first to fourth light shielding members 211 to 214 have the slits.

Condition 4: the case where the first to fourth light shielding members 211 to 214 are all arranged in the same way as in the arrangement of Condition 1 but the slit described above is formed in each of the first to fourth light shielding members 211 to 214.

The sound pressure levels of the noise are evaluated from the direction (indicated by a first direction in FIG. 12) on the side of the light shielding member 213 in the X-axis direction to be described later. The third and fourth light shielding members 212 and 214 provided on the side opposite to the light source are configured to be separated away from the polygon mirror 103, and it can be understood that the sound pressure level is decreased by 5.0 dB at 60000 rpm. By comparing Condition 1 with Condition 4, it can be understood that the sound pressure level of the noise is decreased by 3.5 dB by forming the slits to the light shielding members.

In addition, it is preferable that at least one light shielding member is provided so as not to be in parallel to the Y axis. More specifically, it is preferable that the light shielding member is provided to be deviated away from the Y-axis direction toward the rotation direction of the polygon mirror. When the light shielding member is provided near the polygon mirror, because the air flow (rotating in the same direction as the polygon mirror) caused by the polygon mirror is disturbed by the light shielding member, the noise occurs. Therefore, in order to reduce the noise, it is preferable that the light shielding member is provided along the air flow caused by the rotation of the polygon mirror.

It can be understood from the table of FIG. 7 that the first and second light shielding members 211 and 213 are configured to be deviated away from the Y-axis direction toward the rotation direction of the polygon mirror, so that the sound pressure level of the noise may be decreased by 2.2 dB.

As shown in the table of FIG. 7, because the light shielding members are provided at positions very close (1.1 mm) to the polygon mirror 103, there is a need to take account of production irregularity or assembly irregularity of the light shielding members.

Figure 8:
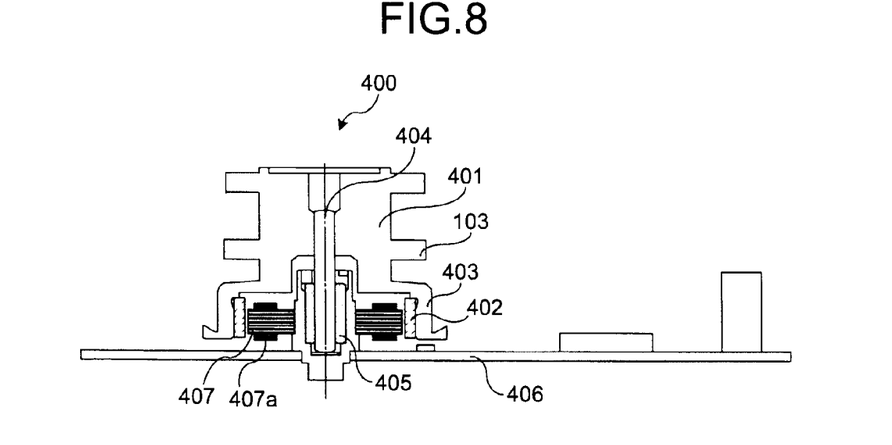
FIG. 8 is a cross-sectional view illustrating the light deflecting unit according to another embodiment.

FIG. 8 is a cross-sectional view illustrating a light deflecting unit (polygon motor) 400 according to another embodiment. A rotating body 401 of the polygon motor 400 is constructed with a flange 403 that supports the polygon mirror 103 and a rotor magnet 402. The polygon motor 400 is configured to include the rotating body 401, a rotating shaft 404 that supports the rotating body 401, a bearing 405 that supports the rotating shaft 404, a circuit board 406 that supports the bearing 405 and on which an electric circuit is implemented, and a stator core 407 to be described later.

The rotor magnet 402 is fixed at a lower portion of an inner surface of the flange 403. The rotor magnet 402 together with the stator core 407 (winding coil 407a) fixed to the bearing 405 configures a brushless motor of an outer rotor type.

The surfaces of the polygon mirror 103 are formed by a cutting process with the rotation center (the rotating shaft) of the mirror as a reference. Therefore, when the polygon motor 400 is positioned in a housing 111, in many cases, the bearing 405 that is on the same line as the rotation center of the polygon mirror 103 may be used as the reference.

When a light shielding member is provided in the housing 911 (exterior member that encases the light deflecting unit) of the optical scanning device, on which the polygon motor 400 is mounted, a tolerance between the polygon mirror 103 and the light shielding member is accumulated in many respects in comparison with a case where the light shielding member is directly provided to the polygon motor 400.

More specifically, a tolerance of the light shielding member; a tolerance of the housing; and tolerances of the bearing, a rotating shaft, and the polygon mirror are accumulated. The accumulation of the tolerance results in a variation in the distance between the polygon mirror and the light shielding member in manufacturing, causing a problem in that the incident lights are shielded but the ghost lights may not be shielded by the light shielding member.

In particular, similarly to the embodiment described before, when the light shielding member is provided at a position very close (1.1 mm) to the polygon mirror 103, the noise may be increased, and interference (collision) may occur between the polygon mirror 103 and the light shielding member.

Therefore, the light shielding member is directly provided to the circuit board 406 that supports the rotating shaft of the polygon mirror 103, thereby stabilizing the distance between the polygon mirror 103 and the light shielding member. Accordingly, the ghost light can be certainly shielded and the noise may be prevented from being increased.

In addition, the light shielding members become more stable in a case where a plurality of light shielding members are integrally provided than a case where the light shielding members having a thickness of several millimeters are provided independently of each other; the distances between the light shielding members and the polygon mirror are also stabilized.

More specifically, as illustrated in FIG. 9, it is preferable that the first to fourth light shielding members 211, 212, 213, and 214 are combined with a top plate 215 of an exterior member or the light shielding members are integrally supported by the top plate 215. In the meantime, FIG. 9 illustrates a shape of the rotating body 401 when the rotating body 401 is allowed to rotate about the rotating shaft.

Figure 10A:
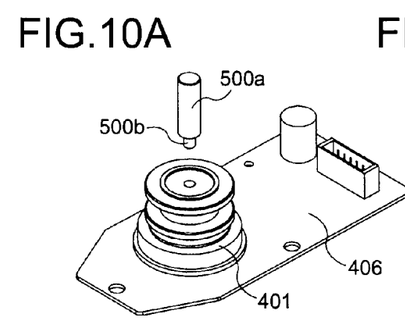
FIGS. 10A to 10D are diagrams illustrating a method for mounting the light shielding member on the light deflecting unit.

FIGS. 10A to 10D are diagrams illustrating a method for providing a light shielding member 216 to the polygon motor 400. Here, the light shielding member 216 is formed integrally by the first to fourth light shielding members 211 to 214 and the top plate 215 as illustrated in FIG. 9, As illustrated in FIG. 10A, an assembly adjustment jig, in which a cylindrical bar 500a having a diameter a and a cylindrical bar 500b having a diameter b (b<a) are integrally formed, is used. The diameter a has a value slightly smaller than a diameter of an opening of the top plate 215, and the diameter b has a value slightly smaller than a diameter of a hole of the rotating body 401.

Mounting processes illustrated in FIGS. 10A to 10D are as follows.

Process 1: a cylindrical bar 500b of the assembly adjustment jig is inserted into the hole of the rotating body 401 (referring to FIG. 10A).

Figure 10B:
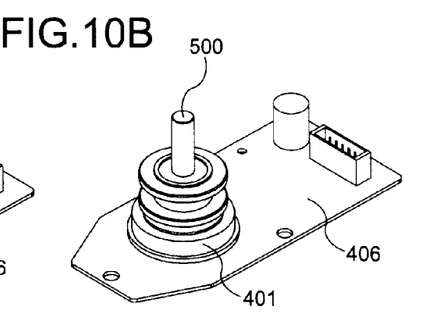
Figure 10C:
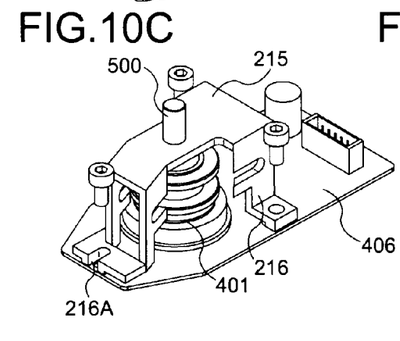
Figure 10D:
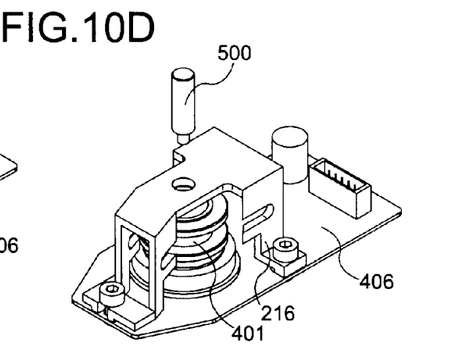

Process 2: the light shielding member 216 is placed on the circuit board 406 so that the cylindrical bar 500a of the assembly adjustment jig is inserted into the opening of the top plate 215 (referring to FIGS. 10B and 10C).

Process 3: the light shielding member 216 and the circuit board 406 are fixed to the housing by using a screw. At this time, a positioning groove 216A is provided to the light shielding member so that the light shielding member 216 does not rotate about a cylindrical bar 500 (referring to FIG. 10C).

Process 4: The cylindrical bar 500 serving as the assembly adjustment jig is extracted from the upper side of the light shielding member 216 (referring to FIG. 10D).

In addition, herein, because the hole of the rotating body 401 together with the hole shrink-fitted by the rotating shaft 404 is formed on substantially the same axis, each light shielding wall may be provided at a desired position accurately with respect to the rotation center of the rotating body 401. Because the surfaces of main body of the polygon mirror are formed by a cutting process with the rotation center of the polygon mirror as a center, accuracy with respect to the center may be increased.

In order to prevent the ghost light reflected by the scanning lens from leaking to the opposite side with respect to the polygon mirror, it is preferable that a scanning optical system is formed by one scanning lens and surfaces thereof in the main-scanning direction are configured to have a biconvex shape. Therefore, when the light reflected by the incident surface of the scanning lens leaks to the opposite side, because the light beam returns to the polygon mirror 103 at a relatively large angle with respect to the X-axis direction, the light may be easily shielded and the amount of light that leaks to the opposite side may be reduced.

In addition, if the surfaces of the scanning lens in the main-scanning direction are configured to have a biconvex shape, the light reflected by an emitting surface of the scanning lens returns to the polygon mirror 103 substantially horizontally with respect to the X-axis direction, so that it is difficult to shield the light and the light may easily leak to the opposite side. However, when the light leaks to the opposite side, if the amount of light reaching the image surface can be reduced, no problem will arise in forming an image. More specifically, the emitting surface of the scanning lens may be configured to have a convex shape of which a curvature radius in the sub-scanning direction is as small as possible. This is accomplished when the incident surface of the scanning lens is configured to have a concave shape in the sub-scanning direction. Then, the emitting surface of the scanning lens may be allowed to have a convex shape in the sub-scanning direction with a small curvature radius.

Figure 11:
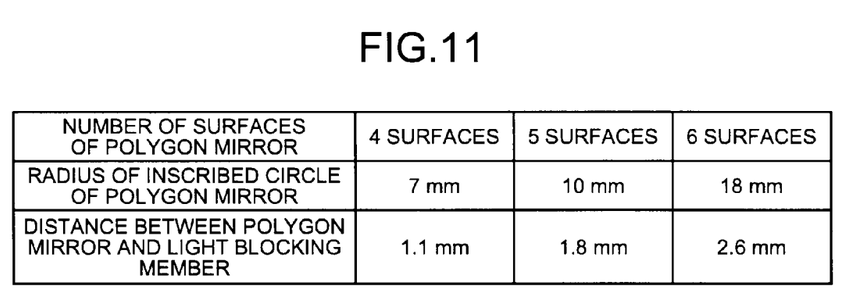
FIG. 11 is a table showing a relation between the number of surfaces of a rotating polygon mirror of the light deflecting unit and a radius of an inscribed circle and a relation between the number of surfaces of the rotating polygon mirror and a distance from the light shielding member.

In the meantime, the highest effect of the optical scanning device according to the embodiment can be obtained with the polygon mirror when the radius of the inscribed circle is small and when a polygon mirror having five surfaces or less is used as the polygon mirror 103 configuring the light deflecting unit. As illustrated in FIG. 11, the radius of an inscribed circle of the polygon mirror 103 required for a constant angle of image tends to be decreased as the number of surfaces is decreased. On the other hand, if the radius of an inscribed circle of the polygon mirror 103 is decreased, the polygon mirror 103 and the light shielding member become close to each other in the positional relation so that the ghost light can be easily incident on the scanning optical system on the opposite side as described above.

As illustrated in FIG. 11, in the polygon mirror 103 of which the number of surfaces is five or less, the distance between the polygon mirror and the light shielding member becomes less than 2 mm, so that it is difficult to dispose the light shielding member on the housing in terms of the tolerance.

In the optical scanning device according to the embodiment, as illustrated in FIGS. 10A to 10D, the light shielding member 216 that is integrally formed by combining the above configurations is mounted on the polygon motor 400, and the change in the sound pressure level in the radial direction about the axis of rotation of the polygon mirror 103 is evaluated.

In addition, the distance between each of the first to fourth light shielding members 211 to 214 configuring the light shielding member 216 and the center of the polygon mirror 103 (referring to FIG. 5) is set so that R1=R3=10.7 mm and
R2=R4=13.2 mm.

Figure 12:
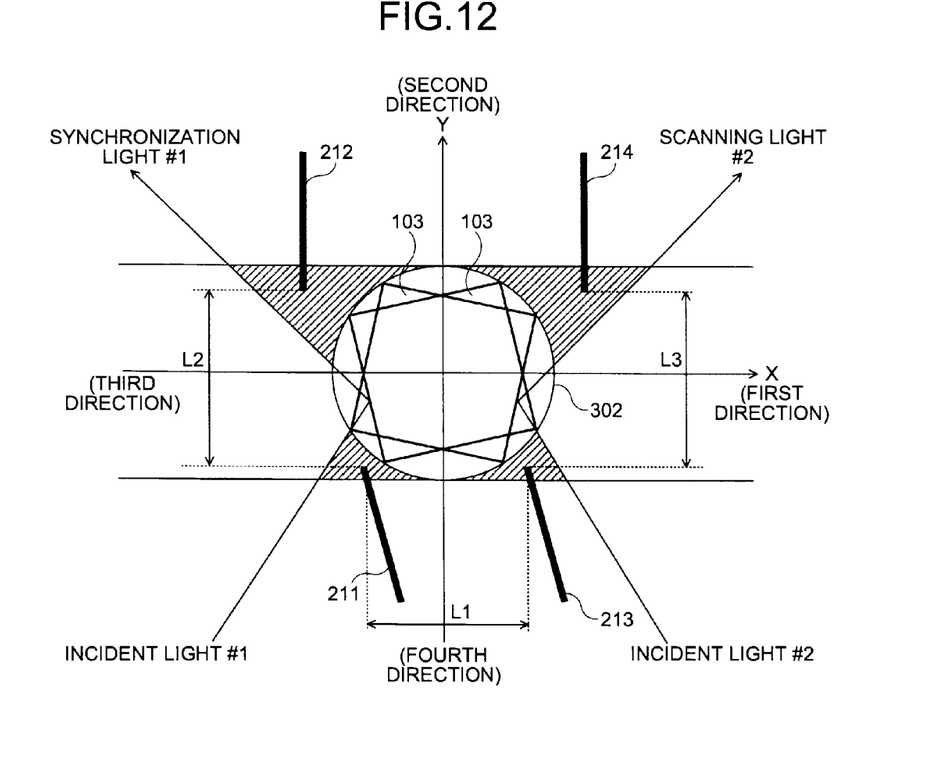
FIG. 12 is a schematic diagram illustrating an example of arrangement of the light shielding member in the optical scanning device according to the embodiment.

As illustrated in FIG. 12, two light shielding members that are provided so that at least a portion thereof is present in an area surrounded by the circumscribed circle 302 of the polygon mirror 103, a straight line 303 that is perpendicular to the Y axis and is tangential to the circumscribed circle 302, and an optical axis of a light beam of an incident light are referred to as a first light shielding member 211 and a second light shielding member 213, and two light shielding members that are provided so that at least a portion thereof is present in an area surrounded by the circumscribed circle 302 of the polygon mirror 103, the straight line 303 that is perpendicular to the Y axis and is tangential to the circumscribed circle, and a borderline of the area where an optical axis of the light beam deflected by the polygon mirror 103 passes through are referred to as a third light shielding member 212 and a fourth light shielding member 214.

With respect to an interval of the edge points of the first to fourth light shielding members 211 to 214, when the distance between the first light shielding member 211 and the second light shielding member 213 in the X-axis direction is denoted by L1, the distance between the first light shielding member 211 and the third light shielding member 212 in the Y-axis direction is denoted by L2, and the distance between the second light shielding member 213 and the fourth light shielding member 214 in the Y-axis direction is denoted by L3, it is preferable that the relation L1<L2 or the relation L1<L3 is satisfied.

In the embodiment, the distances are set to be

L1=12.5 mm and

L2=L3=16.3 mm.

Figure 13:
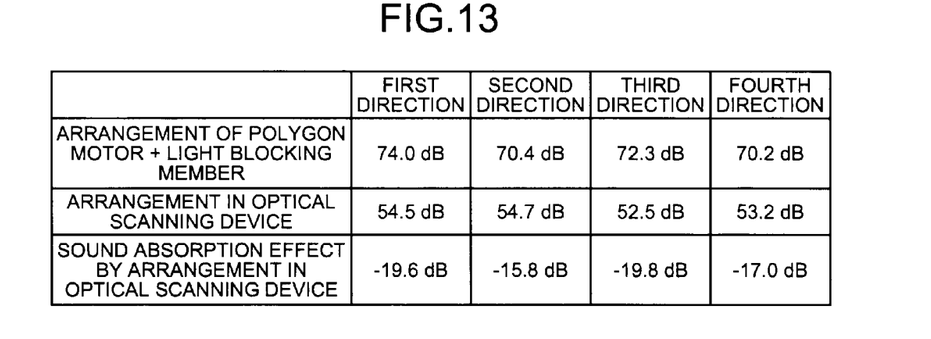
FIG. 13 is a table showing evaluation results of sound pressure levels due to noise in a first to fourth directions.

When a direction on the side of the light shielding member 213 on the X axis is referred to as a first direction, a direction on the side of the first light shielding member 211 on the X axis is referred to as a third direction, a direction on the side of the light shielding member 214 on the Y axis is referred to as a second direction, and a direction on the side of the first light shielding member 211 on the Y axis is referred to as a fourth direction, the sound pressure level of a noise caused by the rotation of the polygon mirror 103 is shown in FIG. 13. All the results of the measurement are obtained by evaluating the sound pressure at a position separated away from the polygon mirror 103 by 50 cm.

With respect to the distances between the light shielding members illustrated in FIG. 12, the configuration is made so that one of the relations between L1<L2 and L1<L3 is satisfied. Accordingly, the sound pressure levels in the Y-axis direction (in the second and fourth directions) may be suppressed in comparison to the sound pressure levels in the X-axis direction (in the first and third directions).

On the other hand, when the light shielding member 216 that is integrally formed as illustrated in FIGS. 10A to 10D and the polygon motor 400 are mounted on the optical scanning device 100, a large number of members having a sound absorption effect, such as the scanning lens 104, the reflecting mirrors 105 and 106, and a large number of members are provided on an extension of a straight line in the X-axis direction.

FIG. 13 illustrates the sound pressure levels measured at a position outside the optical scanning device 100 when the light shielding member 216 and the polygon motor 400 having the configurations described above are mounted on the optical scanning device 100.

It is clarified that the sound pressure levels in the X-axis direction (the first and third directions) are higher by about 2 to 4 dB than the sound pressure levels in the Y-axis direction (the second and fourth directions). It can be clearly understood from this result that the sound pressure level of noise occurring from the optical scanning device may be reduced if the light shielding members are arranged so that the scanning lenses are provided in the direction where the sound pressure level is high with respect to the rotating shaft of the light deflecting unit as a center.

Figure 14A:
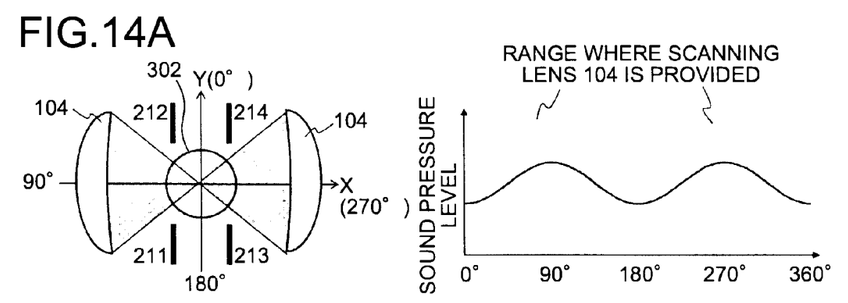
FIGS. 14A to 14C are diagrams illustrating arrangement of two to four light shielding members and schematic diagrams illustrating a change in a sound pressure level due to noise in a rotational direction of a light deflector.
Figure 14B:
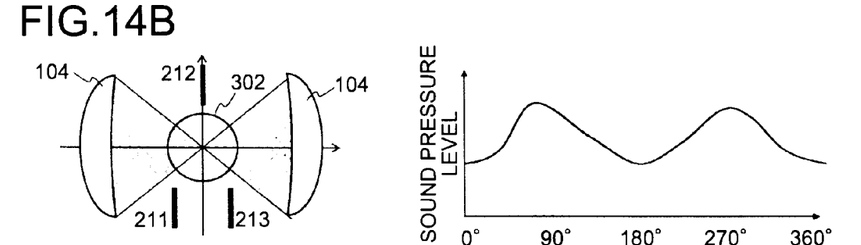
Figure 14C:
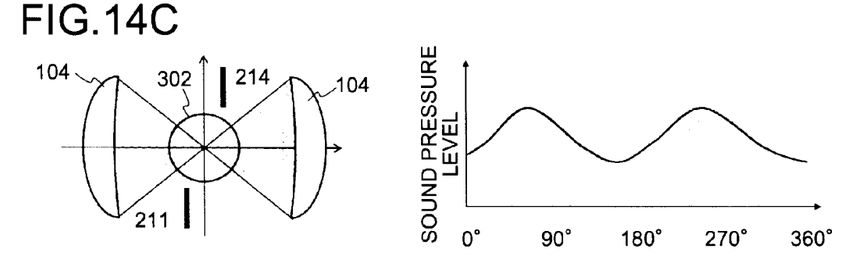

FIGS. 14A to 14C are diagrams illustrating arrangement of two to four light shielding members and schematic diagrams illustrating a change in the sound pressure level of the noise in the rotation direction of the light deflector.

It can be understood that, in any one of FIGS. 14A to 14C, the scanning lenses 104 are provided in the direction where the sound pressure level has a peak.

More specifically, as illustrated in FIG. 14B, when three light shielding members are to be arranged, the first light shielding member 211, the third light shielding member 212, and the second light shielding member 213 may be provided so that a perpendicular bisector of an edge point of the light shielding member 212 and an edge point of the first light shielding member 211 and another perpendicular bisector of an edge point of the third light shielding member 212 and an edge point of the second light shielding member 213 intersect the scanning lens 104. Then, the noise that occurs may be absorbed by the scanning lens 104 and the sound pressure due to noise occurring may be reduced.

In addition, as illustrated in FIG. 14C, when two light shielding members are to be provided, the light shielding members may be provided so that a perpendicular bisector of the edge points of the two light shielding members intersects the scanning lens 104. Then, the noise may be absorbed by the scanning lens 104 and the sound pressure due to noise occurring may be reduced.

As an effect of the embodiments, it is possible to shield a ghost light and to reduce the sound pressure level of noise at a low cost without an increase in the number of components by providing the scanning optical device used as a sound absorbing member to directional noise caused by the presence of the light shielding member.

According to the embodiments, the ghost light can be certainly shielded.

According to the embodiments, the sound pressure level of noise caused by the mounting of the light shielding member can be reduced at a low cost. More specifically, in a case where the light shielding member is provided according to the configuration described above, although noise level in the X-axis direction is greater than that in the Y-axis direction, because the scanning optical device is provided in the X-axis direction, the sound pressure level of noise in the entire apparatus is reduced as a whole.

According to the embodiments, the sound pressure level of noise may be reduced because the borderline of the edge surface conforms to an air flow.

According to the embodiments, the sound pressure level of the noise can be reduced because the light shielding member is provided near the rotating polygon mirror.

According to the embodiments, the light shielding member may be positioned based on the center of the rotating polygon mirror; the ghost light may be certainly shielded by adjusting the arrangement of the light shielding member on the reflective surface with high accuracy; and the sound pressure level of noise may be reduced.

According to the embodiments, the probability that the light beam reflected by the incident surface of a scanning lens leaks to a side opposite to the scanning lens becomes low and an amount of light that leaks to the opposite side may be reduced.

According to the embodiments, the curvature of the emitting surface of the scanning lens is decreased, and an amount of the ghost light that leaks to the opposite side may be reduced.

According to the embodiments, a quality of the formed image may be improved, and the sound pressure level of directional noise occurring due to the rotation of the rotating polygon mirror may be reduced by the mounting of the light shielding member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source unit;
   a light deflecting unit that deflects a light beam emitted from the light source unit; and a scanning optical device that focuses the light beam deflected by the light deflecting unit on a scanned surface, wherein the scanning optical device is provided in a direction in which there is a sound pressure level of a noise caused by rotation of a rotating polygon mirror included in the light deflecting unit, wherein when a direction parallel to a scanning direction of the light beam that passes through a rotation center of the rotating polygon mirror included in the light deflecting unit and scans the scanned surface is set as a Y axis;

a direction that is perpendicular to a rotating shaft of the rotating polygon mirror is set as an X axis;

two light shielding members provided such that at least a portion thereof is present in an area surrounded
- by a circumscribed circle of the rotating polygon mirror,
- by a first straight line that is perpendicular to the Y axis and is tangential to the circumscribed circle, and
- by a first optical axis of the light beam emitted from the light source unit are denoted by a first light shielding member and a second light shielding member;

other two light shielding members provided such that at least a portion thereof is present in an area surrounded
- by the circumscribed circle of the rotating polygon mirror,
- by a second straight line that is perpendicular to the Y axis and is tangential to the circumscribed circle, and
- by a second optical axis of the light beam emitted from the light source unit and deflected by the light deflecting unit are denoted by a third light shielding member and a fourth light shielding member;

a distance, in the X-axis direction, between the first light shielding member and the second light shielding member is denoted by L1;

a distance, in the Y-axis direction, between the first light shielding member and the third light shielding member is denoted by L2; and a distance, in the Y-axis direction, between the second light shielding member and the fourth light shielding member is denoted by L3, one of a relation of L1<L2 and a relation of L1<L3 is satisfied.

2. The optical scanning device according to claim 1, wherein
- a straight line that connects an upper edge portion of the first light shielding member and an upper edge portion of the second light shielding member in the Y-axis direction intersects the circumscribed circle of the rotating polygon mirror at two points, and
- a straight line that connects a lower edge portion of the third light shielding member and a lower edge portion of the fourth light shielding member in the Y-axis direction intersects the circumscribed circle of the rotating polygon mirror at two points.

3. The optical scanning device according to claim 1, wherein at least one of the light shielding members is configured such that an edge portion thereof on a side of the light deflecting unit has a curved surface that is parallel to the circumscribed circle of the rotating polygon mirror.

4. The optical scanning device according to claim 1, wherein
the light deflecting unit is configured such that a plurality of rotating polygon mirrors are stacked at a predetermined interval in a direction of a rotating shaft of the rotating polygon mirrors, and
one of the light shielding members has a slit corresponding to an interval of reflective surfaces of the rotating polygon mirrors that are stacked in the direction of the rotating shaft.

5. The optical scanning device according to claim 1, wherein at least one of the light shielding members is provided so as not to be parallel to a Y axis that is parallel to a scanning direction of the light beam
that passes through a rotation center of the rotating polygon mirror included in the light deflecting unit and
that scans the scanned surface.

6. The optical scanning device according to claim 5, wherein at least one of the light shielding members is provided to be deviated away from the Y-axis direction toward a rotation direction of the rotating polygon mirror.

7. The optical scanning device according to claim 1, further comprising a rotation substrate that supports a rotating shaft of the rotating polygon mirror,
wherein one of the light shielding members is provided on the rotation substrate.

8. The optical scanning device according to claim 1, wherein one of the light shielding members is one of being combined and being integrally formed with a top plate of an exterior member that encases the light deflecting unit.

9. The optical scanning device according to claim 8, wherein the top plate of the exterior member has an opening such that a center thereof coincides with a center of a rotating shaft of the rotating polygon mirror.

10. The optical scanning device according to claim 1, wherein the rotating polygon mirror has a hole portion such that a center thereof coincides with a center of a rotating shaft of the rotating polygon mirror.

11. The optical scanning device according to claim 10, wherein a top plate of an exterior member that encases the light deflecting unit has an opening such that a center thereof coincides with a center of the rotating shaft of the rotating polygon mirror and a diameter of the opening is larger than a diameter of a hole portion of the rotating polygon mirror.

12. The optical scanning device according to claim 1, wherein the scanning optical device includes a lens that has a biconvex shape in a main-scanning direction.

13. The optical scanning device according to claim 12, wherein the scanning optical device includes a lens of which an incident surface in a sub-scanning direction has a concave shape and an emitting surface in the sub-scanning direction has a convex shape.

14. The optical scanning device according to claim 1, wherein a radius of an inscribed circle of the rotating polygon mirror is less than or equal to 10 mm.

15. The optical scanning device according to claim 1, wherein the scanning optical device is provided in a direction in which a sound pressure level of a noise caused by rotation of the rotating polygon mirror included in the light deflecting unit is highest.

* * * * *